(No Model.)

J. W. RATCLIFF & M. G. WATSON.
FORGE TWYER.

No. 593,240. Patented Nov. 9, 1897.

Witnesses
John F. Seuferwied
Edwin Cruse

Inventors
John W. Ratcliff
Morton G. Watson
By their Attorneys,
C. A. Snow & Co.

UNITED STATES PATENT OFFICE.

JOHN W. RATCLIFF AND MORTON G. WATSON, OF WEBBVILLE, KENTUCKY.

FORGE-TWYER.

SPECIFICATION forming part of Letters Patent No. 593,240, dated November 9, 1897.

Application filed September 13, 1897. Serial No. 651,521. (No model.)

*To all whom it may concern:*

Be it known that we, JOHN W. RATCLIFF and MORTON G. WATSON, citizens of the United States, residing at Webbville, in the county of Lawrence and State of Kentucky, have invented a new and useful Twyer, of which the following is a specification.

This invention relates to twyers, its object being to provide devices of this character with a simple and efficient valve by which the admission of the blast to the casing may be accurately regulated and the same valve will serve to control an opening for the discharge of cinders and dirt from the casing.

With this object in view the invention consists in the several details of construction and combination of parts, as will be hereinafter fully described, and particularly pointed out in the claims.

Figure 1:
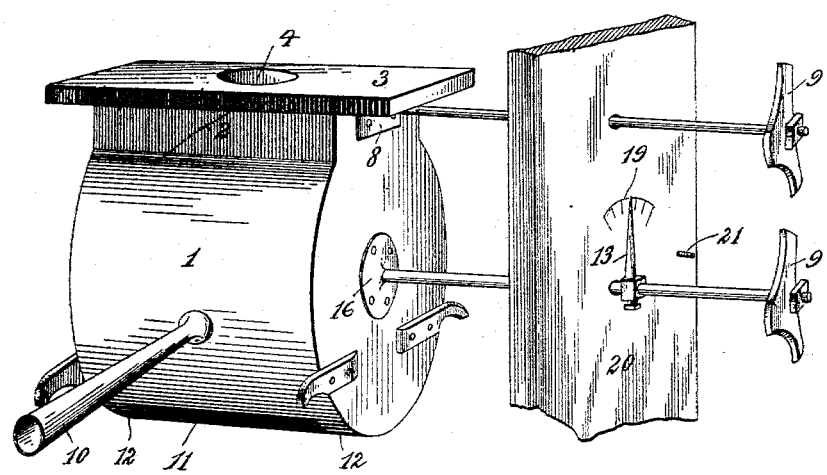
Figure 2:
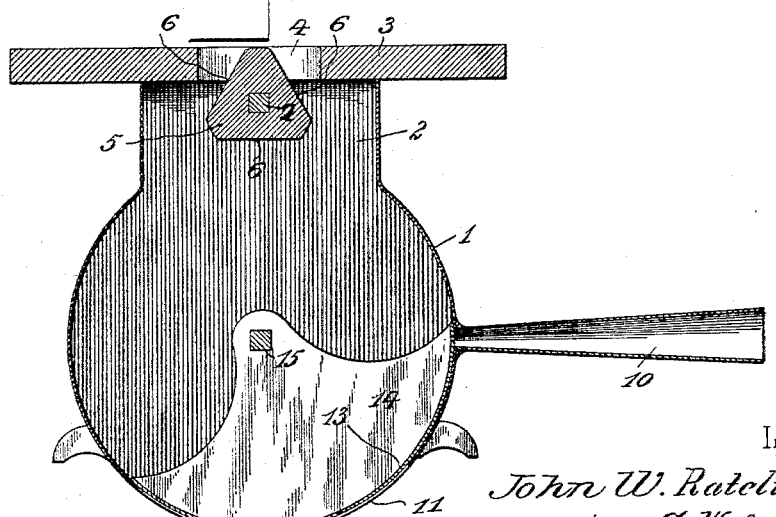

In the drawings, Figure 1 is a perspective view of our improved twyer. Fig. 2 is a sectional view of the same.

Similar numerals of reference designate corresponding parts throughout both figures of the drawings.

1 indicates the casing, the main portion of which is cylindrical in form and which is provided at its upper portion with a rectangular chamber or extension 2.

3 indicates the cover-plate, which is supported on the top of the chamber 2 and provided with a central circular opening 4.

5 indicates a globular valve provided with a series of flat faces, (indicated by 6,) which faces will preferably be of unequal area, and this valve is carried by a shaft 7, which is supported in suitable bearings 8 in the ends of the chambers 2 and provided at one end with a handhold 9. The valve 5 will work within the chamber 2 and control and regulate the volume of air flowing from the casing to the fire through the opening 4 in the cover-plate.

10 indicates the blast-pipe, communicating with the interior of the cylindrical casing at one side thereof. The lower portion of the casing 1 is cut out to form a discharge-opening 11 of considerable area, and this opening will extend in close proximity to the ends of the casing, so as to leave narrow ways or guides, (indicated at 12.) The function of this opening is to discharge cinders and dirt, which will fall into the casing through the opening in the cover-plate.

13 indicates a semicylindrical plate of the same curvature as the cylindrical casing, and this plate is firmly secured on a series of segmental supports, (indicated by 14,) which latter are secured at their apexes on a shaft 15. The shaft 15 is journaled in suitable bearings 16 in the ends of the casing and is provided at one end with a handle 17. The plate 13 will be of sufficient area to close the blast 10 at its entrance into the casing and also the discharge-opening 11, and the plate will work in close contact with the interior of the cylindrical casing and be supported at its ends on the narrow ways or guides 12 when moving to close or unclose the opening 11.

18 indicates a hand or pointer which is secured on the shaft 15, and 19 indicates a scale on the wall 20 of the forge, with which the pointer 18 is adapted to coöperate.

21 indicates a stop which projects out from the wall of the forge and is adapted to be engaged by the pointer when the plate 13 has been moved by the shaft to completely unclose the opening 11.

From the foregoing description it will be seen that by operating the shaft 15 the plate-valve 13 can be shifted to regulate the admission of air from the blast-pipe into the casing or to entirely shut it off and that the position of the plate relative to the blast-opening will be accurately indicated by the pointer and scale. The plate can also be turned to entirely unclose the opening 11 in order that cinders and dirt that may have accumulated in it may be discharged therefrom, and during such discharge the blast-opening will be entirely closed by the plate, and consequently gas will be prevented from passing into the bellows or other blast-producing device.

It will be understood that changes in the form, proportion, and the minor details of construction may be resorted to without departing from the spirit or sacrificing any of the advantages of the invention.

Having thus described the invention, what is claimed as new is—

1. In a twyer, the combination with a cylindrical casing having a blast-receiving opening in its side and a cinder-discharge opening in its lower portion, of a shaft journaled in the ends of the casing, and a semicylindrical plate-valve carried by the said shaft to work in close contact with the interior of the casing and of sufficient area to close both of said openings, substantially as described.

2. In a twyer, the combination with a cylindrical casing having a blast-receiving opening in its side, and a cinder-discharge opening in its lower end, of a shaft journaled in the ends of the casing, segmental supports secured to the shaft, and a semicylindrical plate-valve secured to said supports to work in close contact with the interior of the casing, and of sufficient area to close both of said openings simultaneously, substantially as described.

3. In a twyer, the combination with a cylindrical casing having a blast-receiving opening in its side, and a cinder-discharge opening in its lower portion, of a shaft journaled in the ends of the casing, a semicylindrical plate-valve carried by said shaft to work in close contact with the interior of the casing, and of sufficient area to close both of said openings simultaneously, a pointer on the shaft exterior to the casing, and a scale with which said pointer operates to indicate the position of the said plate-valve, substantially as described.

4. In a twyer, the combination with a cylindrical casing having a blast-receiving opening in its side, a cinder-discharge opening in its lower portion, and a rectangular extension at its upper end, of a cover-plate having a central circular opening supported on said extension, a globular valve supported in said extension to control the opening in the cover-plate, a shaft journaled in the ends of the cylindrical casing, and a semicylindrical plate-valve carried by said shaft to work in close contact with the interior of the casing, and of sufficient area to close both the blast-receiving opening and the cinder-discharge opening simultaneously, substantially as described.

In testimony that we claim the foregoing as our own we have hereto affixed our signatures in the presence of two witnesses.

JOHN W. RATCLIFF.
MORTON G. WATSON.

Witnesses:
W. A. KITCHEN,
J. P. PENNINGTON.